No. 734,347. PATENTED JULY 21, 1903.
J. B. MOORE.
BREECH MECHANISM.
APPLICATION FILED DEC. 18, 1902.
NO MODEL. 7 SHEETS—SHEET 1.

WITNESSES:

INVENTOR
John B. Moore
BY Munn & Co.
ATTORNEYS.

No. 734,347. PATENTED JULY 21, 1903.
J. B. MOORE.
BREECH MECHANISM.
APPLICATION FILED DEC. 18, 1902.
NO MODEL. 7 SHEETS—SHEET 2.

WITNESSES:

INVENTOR
John B. Moore.
BY
ATTORNEYS.

No. 734,347. PATENTED JULY 21, 1903.
J. B. MOORE.
BREECH MECHANISM.
APPLICATION FILED DEC. 18, 1902.
NO MODEL. 7 SHEETS—SHEET 3.

WITNESSES:
Fred. Bradford
Perry B. Turpin

INVENTOR
John B. Moore.
BY Munn & Co.
ATTORNEYS.

No. 734,347. PATENTED JULY 21, 1903.
J. B. MOORE.
BREECH MECHANISM.
APPLICATION FILED DEC. 18, 1902.
NO MODEL. 7 SHEETS—SHEET 4.

WITNESSES:
Fred P. Bradford
Perry B. Turpin

INVENTOR
John B. Moore.
BY Munn & Co.
ATTORNEYS.

No. 734,347. PATENTED JULY 21, 1903.
J. B. MOORE.
BREECH MECHANISM.
APPLICATION FILED DEC. 18, 1902.
NO MODEL. 7 SHEETS—SHEET 5.

WITNESSES:

INVENTOR
John B. Moore.
BY Munn & Co.
ATTORNEYS.

No. 734,347. PATENTED JULY 21, 1903.
J. B. MOORE.
BREECH MECHANISM.
APPLICATION FILED DEC. 18, 1902.
NO MODEL. 7 SHEETS—SHEET 6.

WITNESSES
Fred P. Bradford
Perry B. Turpin

INVENTOR
John B. Moore
BY Munn & Co
ATTORNEYS.

No. 734,347. PATENTED JULY 21, 1903.
J. B. MOORE.
BREECH MECHANISM.
APPLICATION FILED DEC. 18, 1902.
NO MODEL. 7 SHEETS—SHEET 7.

WITNESSES:
INVENTOR
John B. Moore
BY
ATTORNEYS

No. 734,347.

Patented July 21, 1903.

UNITED STATES PATENT OFFICE.

JOHN B. MOORE, OF WASHINGTON, DISTRICT OF COLUMBIA.

BREECH MECHANISM.

SPECIFICATION forming part of Letters Patent No. 734,347, dated July 21, 1903.

Application filed December 18, 1902. Serial No. 135,721. (No model.)

*To all whom it may concern:*

Be it known that I, JOHN B. MOORE, a citizen of the United States, residing at Washington, in the District of Columbia, have made certain new and useful Improvements in Breech Mechanism, of which the following is a specification.

My invention is an improvement in the breech mechanism of guns, and has for an object, among others, to provide a mechanism in which the threads between the block and breech of the gun will be uninterrupted and cylindrical in general form and multiple, together with means for operating the moving parts of the mechanism in adjusting the breech-block into and out of position for closing the breech of the gun; and the invention consists in certain novel constructions and combinations of parts, as will be hereinafter described and claimed.

In the drawings, Figs. 6ª and 7ª are cross-sections on about line *x x* of Fig. 4, showing the parts in the positions illustrated, respectively, in Figs. 6 and 7.

Figure 1:
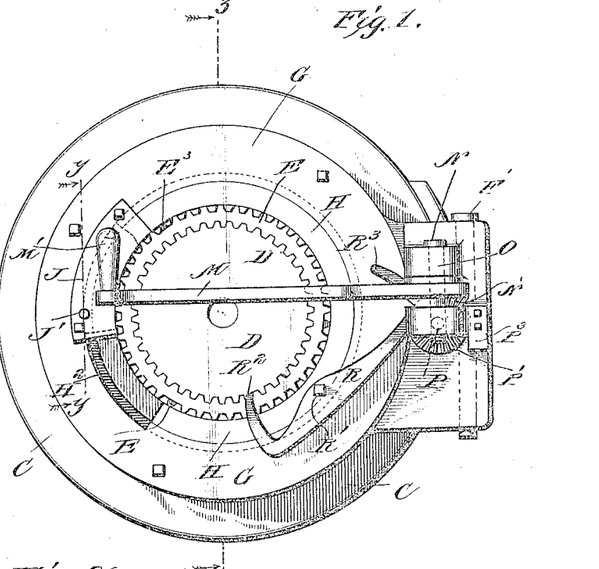
Figure 1 is an end elevation, and Fig. 2 a top plan view, of the breech of the gun with the breech mechanism closed.
Figure 2:
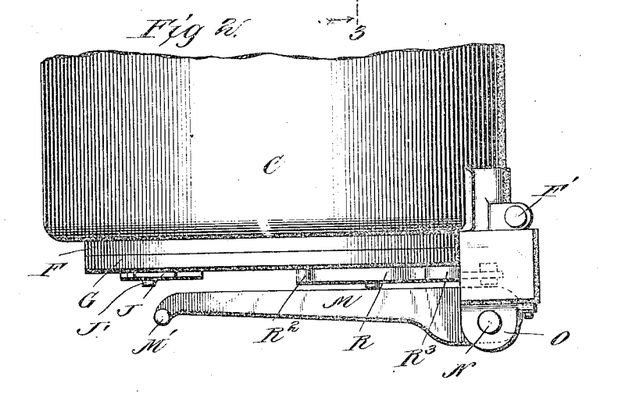
Figure 3:
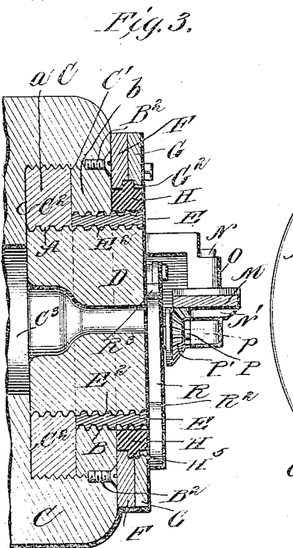
Fig. 3 is a vertical longitudinal section on about line 3'3 of Fig. 1.

The gun-breech is provided with right-hand threads A and left-hand threads B. By preference these threads are provided in separate rings *a* and *b*, which are threaded on their outer circumference and screw into a threaded socket C', formed in the breech of the gun C, as shown in Fig. 3. The gun is shouldered at $C^2$, and its bore $C^3$ is slightly smaller than the inner diameter of the ring *a*, so the said ring *a* when screwed into the breech of the gun will abut the shoulder $C^2$, and the latter will project inwardly beyond the threads A and will form an abutment for the breech-block when the latter is closed, as shown in Fig. 3. The ring *b*, having the left-hand threads B, is screwed up against the ring *a*, as shown in Fig. 3, and these rings *a* and *b* may be secured by means of a screw $B^2$, as shown in Fig. 3, or otherwise, as may be desired. The inner diameter of the ring *b* is larger than that of the ring *a*, so the latter ring forms an abutment for the locking-ring presently described, as best shown in Fig. 3 of the drawings. By the described construction it will be noticed I provide in the breech of the gun internal right and left hand threads for engagement by corresponding threads on the breech-block and locking-ring, and it will also be noticed that these threads are multiple and have a very considerable pitch, so the block and the locking-ring presently described can be turned home with but a small movement, thus facilitating the introduction and removal of the breech-block and its locking-ring as desired.

It will be understood that I prefer to provide the threads A and B in separate rings and to secure the latter in the breech-block for convenience in manufacture; but it should also be understood that I do not desire to be limited in the broad features of my invention to this detail of construction.

Figure 7:
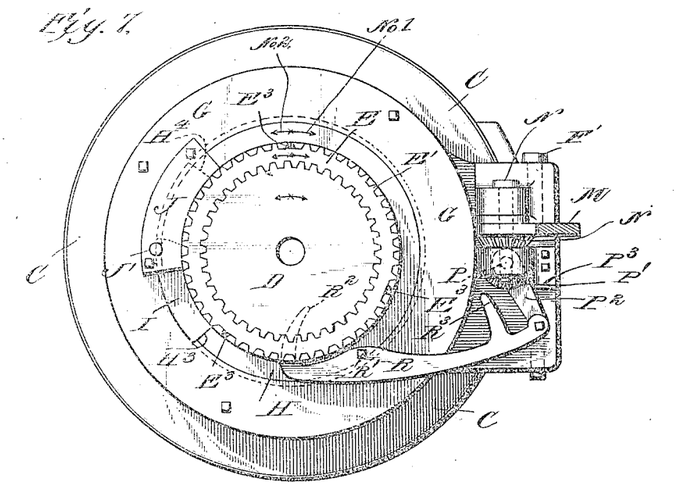
Fig. 7 is an end elevation of the gun, showing the parts in the position they occupy at the end of the second removing movement.
Figure 7A:
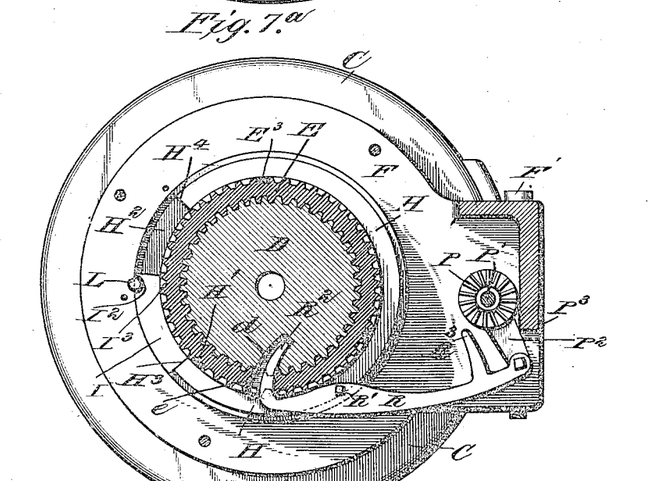
Figures 15, 16, 17, 18, 19:
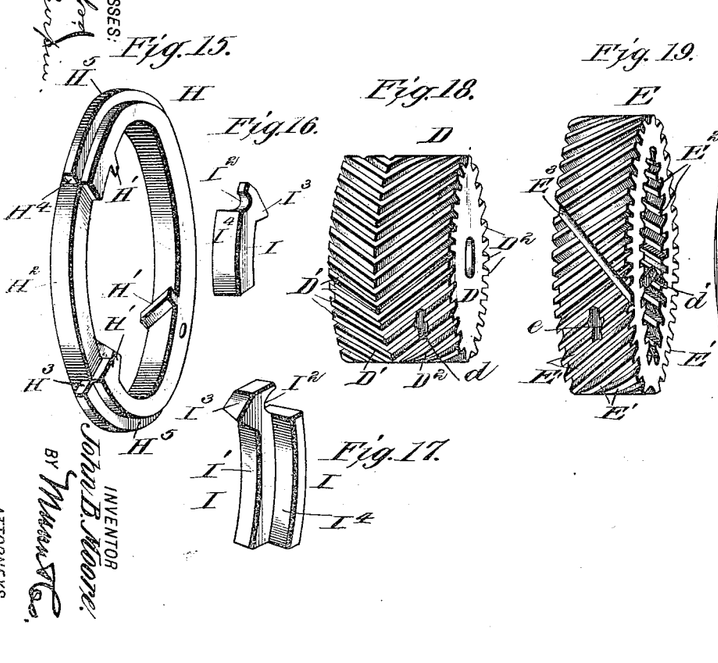
Fig. 15 is a detail perspective view of the operating-ring.
Figs. 16 and 17 are detail perspective views of the latch-plate.
Fig. 18 is a detail perspective view of the breech-block.
Fig. 19 is a detail perspective view of the locking-ring.

The breech-block D (shown in detail in Fig. 18) is provided with right-hand threads D' and left-hand threads D², both in multiple form, and the threads D² being preferably longer than the threads D', as shown in said figure. This plug may be provided with any suitable form of firing-pin, gas-check, or other desired appliance commonly used in heavy ordnance. The threads D' are formed to screw into the threads A of the breech of the gun, and the threads D² are formed to mesh with the internal threads of the locking-ring. (Shown in Fig. 19 and presently described.) The breech-block is provided at $d$ with a socket leading from its outer edge and preferably formed in the threaded portion D² of said block to receive the forward projection on the rocker or rocking pitman presently described. This socket $d$, as shown in Fig. 7ª, curves inwardly to receive the projection on the rocker and to hold the same when inserted in said socket.

Figure 14:
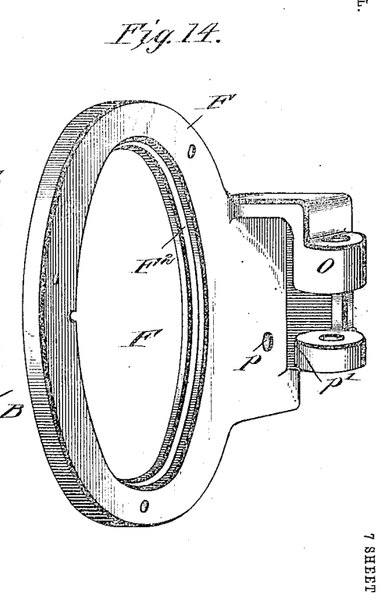
Fig. 14 is a detail perspective view of the main portion of the swinging carrier.
Figures 20, 21, 22, 23, 24:
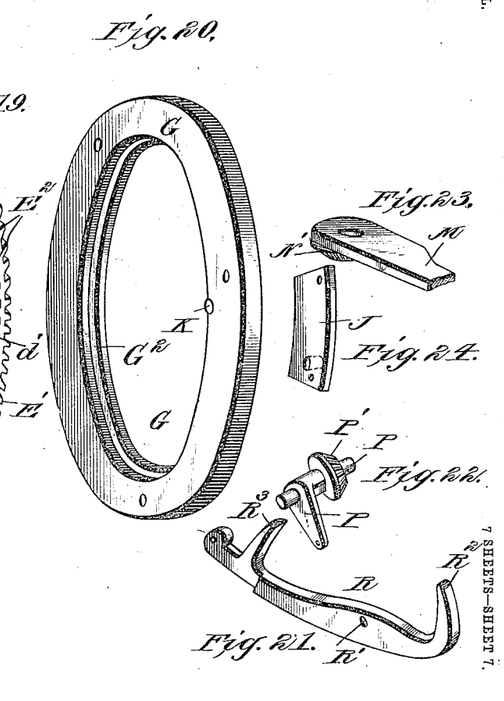
Fig. 20 is a detail perspective view of the cap-ring for application to the main portion of the swinging carrier shown in Fig. 14.
Fig. 21 is a detail perspective view of the rocker or rocking pitman.
Fig. 22 is a detail perspective view of the crank and its shaft and pinion.
Fig. 23 is a detail perspective view of a portion of the handle-lever, showing the pinion to mesh with that of the crank-shaft shown in Fig. 22.
Fig. 24 is a detail perspective view of the cover-plate for the latch mechanism.

The locking-ring E is provided on its exterior with threads E' to screw into the threads B of the gun-breech and also has the internal threads E² to screw on the threads D² of the breech-block and is also provided in its outer face with the grooves E³ for the inwardly-projecting lugs or projections of the operating-ring (shown in Fig. 15) and has the opening $e$ formed from its outer face to receive the forward projection on the rocker or rocking pitman presently described. The breech-block and the locking-ring are both carried by the swinging carrier, and it is manifest that if the locking-ring be held from axial movement and be turned with the breech-block it will turn the latter into and out of any threads with which the breech-block may be meshed. The swinging carrier comprises the main section F (shown in Fig. 14) and the cap ring or section G. (Shown in Fig. 20.) The main section F has a hinge connection at F' with the gun-breech and is rabbeted on its outer side at F² to coöperate with the rabbet G² in the inner face of the cap-plate G to provide a seat within which the operating-ring H is held and can be turned, as will be understood from Fig. 3 of the drawings. The main section F and the cap-ring G are suitably secured together by bolts or otherwise and retain the operating-ring in the seat produced by the rabbets F² and G² before described. This operating-ring H is provided on its outer side with the rib H⁵, which fits within the rabbets F² and G² and has inwardly-projecting lugs H', which operate in the grooves E³, produced in the outer face of the operating-ring H, so the turning of the ring H may operate to turn the locking-ring E, and at the same time the longitudinal or axial movement of the ring G within the operating-ring H will be permitted, it being the purpose of the operating-ring to turn the locking-ring without interfering with the movement of the said locking-ring in an axial direction.

The operating-ring H is cut away or reduced in thickness for a portion of its length at H², providing shoulders H³ and H⁴ at the opposite ends of the cut-away portion and also furnishing a recess or space within which operates the sliding latch-plate I. (Shown in Figs. 16 and 17.) This latch-plate I is held alongside the reduced portion H² of the operating-ring fitting against the other side thereof and being retained by the cover-plate J, held to the other side of the cap-plate G, as shown in Figs. 1, 2, 5, 6, 7, 9, and 10. The latch-plate I also operates between the shoulders H³ and H⁴ of the operating-ring and is in operation lifted by the shoulder H³ and by the engagement of its tooth I³ with one of the threads D² of the locking-ring from the position shown in Figs. 7 and 7ª to that shown in Figs. 6 and 6ª in the operation of the mechanism, as presently described. The latch-plate I is of a special construction, being provided with a body portion I', having near its upper end the notch I² in its outer edge and the tooth I³ projecting from its inner edge and the curved web or flange I⁴ projecting from the inner edge of the body I toward the breech of the gun and operating along the outer side of the portion H² of the operating-ring H, while the body portion I' fits and operates along the outer face of the reduced portion H² of the operating-ring.

The cover-plate J is provided with the inwardly-opening socket J', in which operates the latch-pin K, which is actuated by the spring K' toward the inner face of the swinging carrier and into the path of the latch-plate I and in position to enter the notch I² in said latch-plate when the breech mechanism is open and to bear against the outer end of the releasing-pin at all other times.

Figures 8, 9, 10, 25, 26:
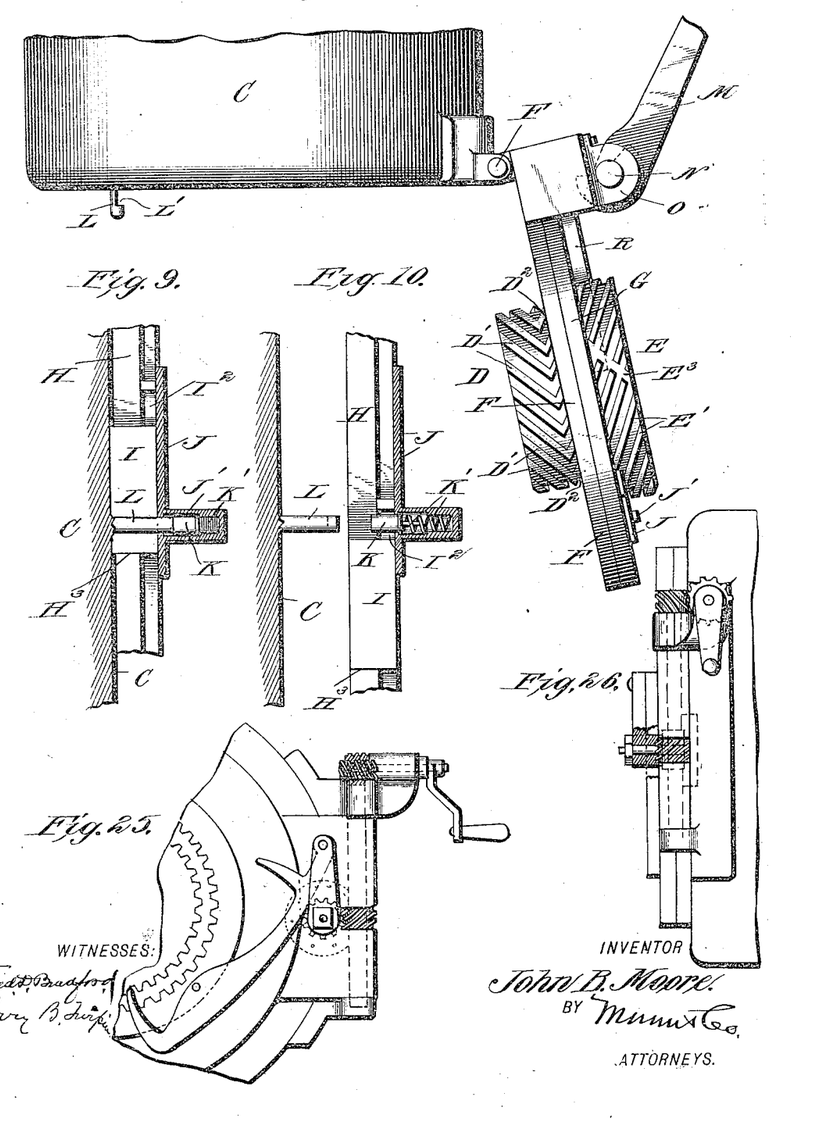
Fig. 8 is a top plan view of the gun with the breech mechanism swung out of the gun-breech.
Fig. 9 is a detail section on about line *y y* of Fig. 1.
Fig. 10 is a view similar to Fig. 9, showing the parts unlatched.
Fig. 25 is a partial face view of the breech, showing a somewhat different construction for operating the mechanism.
Fig. 26 is an edge view, partly in section, of the construction shown in Fig. 25.
Figure 11:
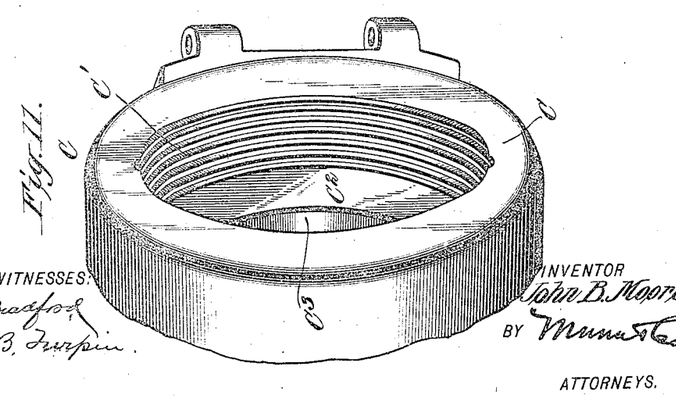
Fig. 11 is a detail perspective view of the gun-breech.
Figure 12:
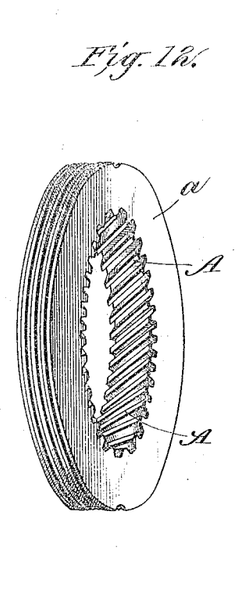
Figs. 12 and 13 are the threaded rings to be screwed into the gun-breech.
Figure 13:
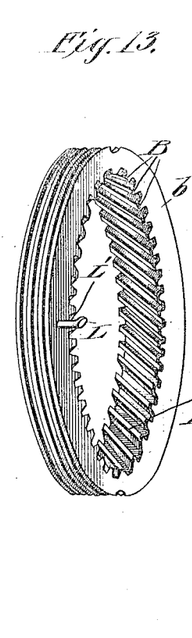

A releasing-pin L projects from the breech of the gun in position to aline with the notch I² in the latch-plate I and with the latch-pin K when the breech mechanism is closed and force the pin K back from the position shown in Fig. 10 to that shown in Fig. 9, thus releasing the latch-plate from the latch-pin, so the latch-plate can be moved longitudinally. The pin L is provided with a slot L' near its end, in which slot the latch-plates slides up and down after the latch-pin K has been released by contact with the releasing-pin L, as will be understood from Figs. 6ª and 7ª. In the position of parts shown in Fig. 8 the latch-pin K rests in the notch I² of the latch-plate I and holds said latch-plate from moving in either direction, and by the abutment of the shoulder H³ against the lower end of the latch-plate I, as well as by the engagement of the tooth I³ with the thread D² of the locking-ring, the said latch-plate holds the operating-ring H from turning in the direction of the arrow 1, (shown in Fig. 7,) so that in swinging the carrier and the attached parts to position to close the breech of the gun the operating-ring cannot move in the direction of the arrow 1 in Fig. 7 beyond the position shown in the said Fig. 7.

The handle-lever M has the handle M' and is fixed to the shaft N, which is journaled in the bearings O of the section F of the swinging carrier and is provided with the bevel-pinion N', which meshes with the bevel-pinion P' on the shaft P, which carries the crank-arm $P^2$, said shaft P being journaled at opposite ends in bearings $p$ and $p'$ in the main section F of the swinging carrier. This crank-arm $P^2$ is connected with one end of the rocker or rocking pitman R, which is pivotally connected at R' between its ends with the operating-ring H, so the swinging of the crank-arm $P^2$ can move the operating-ring in one direction or the other, according to the movement of the crank-arm and the position of the parts. This rocker R is provided on opposite sides of its pivot R' with fingers or projections $R^2$ and $R^3$, which move alternately as the pitman R is rocked into engagement with the parts with which they coöperate in the manner more fully described hereinafter.

Figure 4:
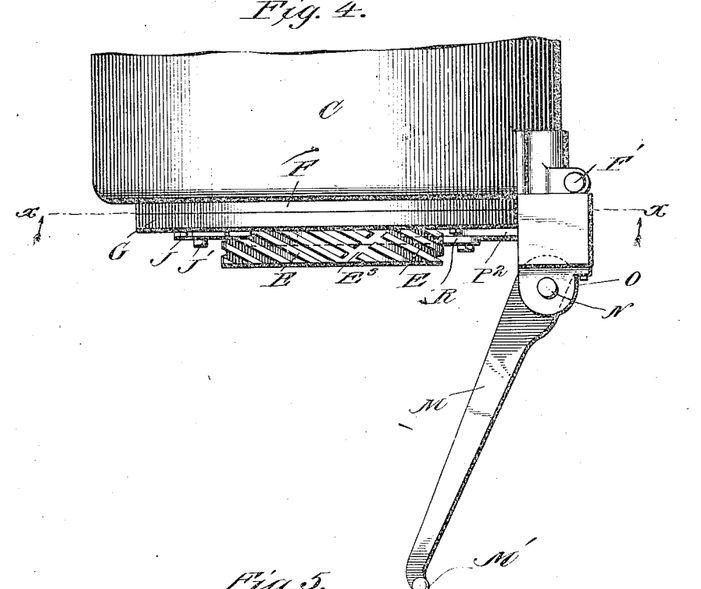
Fig. 4 is a top plan view, and Fig. 5 an end elevation, of the breech of the gun with the parts in the position they occupy at the end of the first removing movement.
Figure 5:
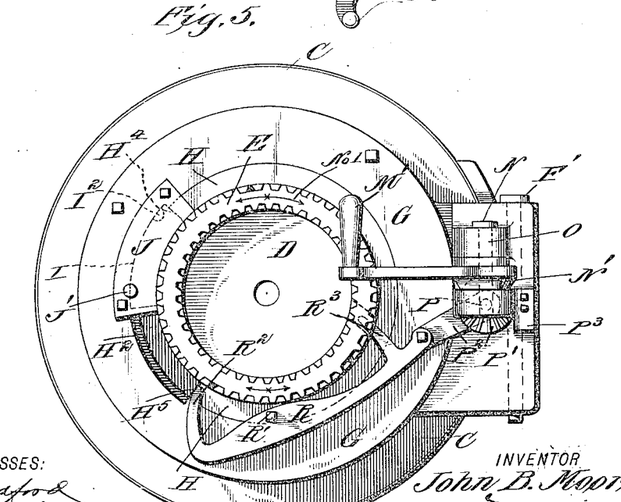
Figure 6:
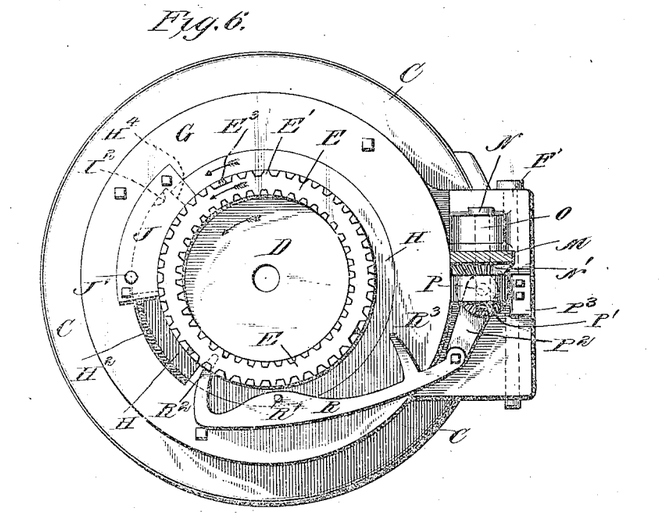
Fig. 6 is an end elevation of the gun, showing the parts in the position they occupy at the beginning of the second removing position.
Figure 6A:
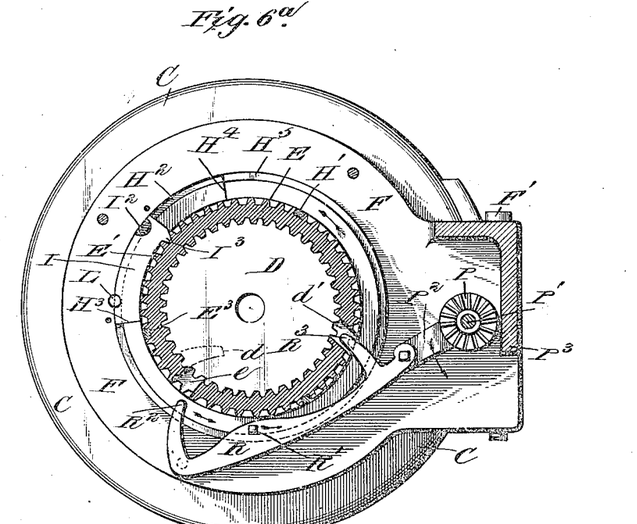

When the swinging carrier and its attached parts are swung to wide-open position, as shown in Fig. 8, the breech-block, locking-ring, pitman, crank, latch, &c., will occupy the relative position shown in Fig. 7. In this figure the crank $P^2$ abuts a shoulder-stop $P^3$ on the carrier and cannot swing outwardly at its lower end, the latch-plate rests at its lower end against the shoulder $H^3$ of the operating-ring and is held from upward movement by the engagement of the latch-pin K in the notch $I^2$, and the finger $R^2$ of the rocker projects through the opening $e$ in the locking-ring and into the socket $d$ in the breech-block, so said breech-block will be held from axial movement. It will then be seen that the operating-ring is locked from movement circumferentially with the carrier in either direction, being held from movement in the direction of the arrow No. 1, Fig. 7, by the engagement of its shoulder $H^3$ with the lower end of the latch-plate, the latter being locked by the latch-pin to the carrier, and from movement in the direction of the arrow No. 2 by its connection with the pitman R and crank $P^2$, the latter abutting the shoulder-stop $P^3$, before described. When in this position, the carrier and its attached parts may be swung back and forth (see Fig. 8) without varying the relative positions of the breech-block, locking and operating ring in the carrier until such time as the latch-pin is released from the latch-plate. It should be understood that I do not mean that the finger $R^2$ when in the position shown in Figs. 7 and 8 positively locks the breech-block from any movement whatever, but only that it holds the said breech-block from any substantial movement, and it will be understood that in practice the ends of the threads on the breech-block may be slightly rounded, if necessary, to insure their entering or properly engaging the threads in the gun-breech. If, therefore, in operation the carrier, &c., be swung from the position shown in Fig. 8 to set the carrier against the breech of the gun and to bring the threads D' of the breech-block into engagement with the outer ends of the threads A of the gun-breech, the releasing-pin on the gun-breech will release the latch-pin and will adjust into such position that the latch-plate can enter the slot L' of such releasing-pin to hold the carrier to the breech of the gun during the opening and closing movements of the block, and I then provide in connection with a latch-plate on the carrier a pin, also in the carrier, by which to lock the latch-plate from movement in the carrier, and a pin on the gun-breech for freeing the latch-pin from the latch-plate and to engage the latch-plate, and so hold the carrier to the gun-breech during the opening and closing movements of the breech-block. When the carrier is adjusted against the breech of the gun and its latch-plate is released, the movement of the handle-lever toward the gun to the points shown in Figs. 4 and 5 operates to turn the breech-block into the threaded portion A of the gun-breech. This is accomplished by the turning of the locking-ring on the threads $D^2$ of the breech-block, when the threads D' of the block engage the outer ends of the threads A of the gun-breech and while the said locking-ring is held from movement longitudinally or in an axial direction by reason of the projection $R^2$ of the rocker R operating in the opening $d$ in the locking-ring. When the parts reach the position shown in Figs. 4 and 5, the block has been screwed home by the turning of the locking-ring in the direction indicated by the arrow No. 1, Figs. 7 and 5. It will be understood from Figs. 5 and 7 that while the block is screwed into the threads A the finger $R^2$ is adjusted from the inner position (shown in Fig. 7) to the outer position (shown in Fig. 5) to permit the axial movement of the breech-block within the locking-ring. The further movement of the crank $P^2$ in the same direction after freeing the projection $R^2$ from engagement with the locking-ring reverses the movement of the operating-ring and locking-ring, throwing the projection $R^3$ of the rocker R through an opening $d'$ in the locking-ring to position to bear in front of the breech-block, so the latter cannot move out, and turns the locking-ring in on the threads $D^2$ of the breech-block and in the threads B of the gun-breech and brings all the parts to the position shown in Figs. 1, 2, and 3. It will be understood that the adjustment of the finger $R^3$ in front of the breech-block is only momentary and during the turning of the locking-ring in on the breech-block and for the purpose of preventing any outward movement of the breech-block until the threads of the locking-ring have commenced to screw into the threads B of the gun-breech. It is manifest that if the finger $R^2$ be adjusted into engagement with the breech-block, so as to hold the latter either from longitudinal or rotary movement, the said block will be held from screwing in either direction. It will also be understood that in the position of parts shown in Fig. 7ª the spur $I^3$ of the latch-plate enters the thread of the locking-ring and holds the said ring from turning. In this position it will be seen the breech-block is screwed into the breech by a thread inclining in one direction and the locking-ring is screwed on the block and in the breech by threads inclining in the opposite direction, so that the block cannot be displaced by an endwise force or pressure. The opening of the breech mechanism is effected by an operation the reverse of that just described. As before suggested, in Figs. 1, 2, and 3 the parts are shown in the position they occupy when the breech is closed by the breech mechanism. To remove the mechanism, the handle is swung outwardly from the position shown in Figs. 1, 2, and 3 toward that shown in Figs. 4 and 5. This movement, by turning the locking-ring on the breech-block, will adjust the locking-ring outwardly and turn it out of its threads B in the breech, completing the first removing movement and bringing the parts to the position shown in Figs. 4 and 5. From the position shown in Figs. 4 and 5 the hand-lever is operated to move the crank to the position shown in Fig. 6 and finally to that shown in Fig. 7, in which the breech-block has been adjusted outwardly and the latch-plate has been lowered to a position in which its notch $I^2$ registers with the releasing-pin on the breech of the gun, so the breech mechanism can be swung open from the position shown in Fig. 2 to that shown in Fig. 8.

As best shown in Figs. 1, 5, 6, 7, 6ª, and 7ª, the face of the retaining-ring G is cut away at $G^3$ to permit the travel of the latch-plate.

In Figs. 25 and 26 the crank-shaft 10 has a worm-wheel 11, meshed by a worm 12 on a shaft 13, having a handle 14, and it will be understood that this construction may be preferable for very heavy guns on shipboard.

Having thus described my invention, what I claim as new, and desire to secure by Letters Patent, is—

1. A breech mechanism comprising a breech-block provided on its outer side with the right and left hand threads, one of which is arranged to screw into the gun, and a locking-ring screwing on the other thread of said block.

2. In a breech mechanism a breech-block provided with the exterior multiple right and left hand threads.

3. A breech mechanism comprising a breech-block provided with uninterrupted right and left multiple threads one of which screws into the breech of the gun, a locking-ring operating on the other threads, a hinged carrier in which said locking-ring is supported, and means carried by the hinged carrier for turning the locking-ring.

4. A breech mechanism comprising a breech-block having series of right and left hand threads, the threads of one series being adapted to screw into and out of the gun, and a ring threaded on the other series of threads and arranged to operate the block.

5. A breech mechanism comprising a breech-block having right and left hand threads the locking-ring screwed on one of the threads, a carrier in which the locking-ring is movable circumferentially and axially, and means whereby the ring may at intervals be held from axial movement in its carrier to cause its revolution to move the breech-block longitudinally.

6. The combination of the swinging carrier, the operating-ring swinging with and arranged to turn in the carrier, the breech-block and locking-ring supported in the swinging carrier and within the operating-ring and turning the hand-lever, gearing between the hand-lever and ring whereby the ring may be turned by the hand-lever, and locking means for holding the ring from turning in the carrier whereby the hand-lever may operate to swing the carrier, and means for releasing such locking means to permit the turning of the operating-ring by the movement of the hand-lever.

7. A breech mechanism comprising a breech-block having right and left hand threads, the locking-ring screwed on one of the threads, a carrier in which the locking-ring is movable circumferentially and axially, an operating-ring movable bodily with and arranged to turn relatively to said carrier and provided with means engaging with the locking-ring whereby to turn the same, means for turning the operating-ring and means carried by the operating-ring for engagement at intervals with the locking-ring whereby to prevent the same from longitudinal movement or movement in direction of its axis.

8. A breech mechanism comprising a swinging carrier, an operating-ring movable bodily with and turning relatively to the carrier and having projections extending from its inner edge, the locking-ring arranged within the operating-ring and having in its outer side grooves to receive the projections of said ring, a breech block within the locking-ring and arranged for operation thereby, and the operating means including a pitman pivoted to the operating-ring and provided with a projection movable into and out of engagement with the locking-ring.

9. The combination of the swinging carrier, the operating-ring carried thereby, the locking-ring within the operating-ring and having internal threads for engagement with those of the breech-block, the breech-block operating in the locking-ring and having right and left threads, the threads of one kind being meshed by those of the locking-ring, and the operating devices provided with means whereby to hold the locking-ring and breech-block at intervals from longitudinal movement or movement in the direction of their axes.

10. In a breech mechanism substantially as described, the combination with the breech-block, the locking-ring threaded thereon and the operating-ring, of the operating devices including a pitman pivoted to the locking-ring and provided on opposite sides of such pivot with fingers or projections movable respectively into and out of engagement with the locking-ring and the breech-block whereby such ring and block may be held at intervals from movement in the direction of their axes.

11. The combination with the breech-block and the locking-ring of the operating-ring, and the operating devices including a crank and a pitman connecting the crank with the locking-ring, the crank and pitman being so related to each other and to the operating-ring that the latter is turned first in one direction and then in the other by a swinging of the crank in one direction.

12. The combination with the breech-block and the locking-ring, of the operating-ring, the swinging carrier in which said parts operate, means for locking the operating-ring from turning in the carrier, and devices on the gun whereby to release said locking means when the breech mechanism is adjusted to position against the breech of the gun and to engage with parts in the carrier to secure the latter against the breech of the gun.

13. The combination of the breech-block having right and left threads, the locking-ring operating on one of said threads, the operating-ring encircling the locking-ring and provided with means for turning the said locking-ring, and the operating devices including a pitman pivoted to the operating-ring and provided on opposite sides of its pivot with projections to engage respectively with the locking-ring and the breech-block.

14. The combination with the gun-breech having internal right and left threads, of the breech-block having threads turning into one set of threads of the breech, and the locking-ring connected with the breech-block and threaded into the other set of threads of the gun-breech.

15. The combination with the gun-breech having right and left threads, of the breech-block having right and left threads one set of which is arranged to screw into the inner threads of the gun-breech, and the locking-ring having internal threads screwing on the outer threads of the breech-block, and external threads screwing in the outer threads of the gun-breech.

16. A breech mechanism comprising a breech-block having right and left threads, a locking-ring meshed with one set of threads of the breech-block, and a rocker pivoted between its ends and movable at one end into engagement with the locking-ring and the breech-block and at its other end into engagement with the breech-block.

17. The combination in a breech mechanism with the gun-breech, the means for closing the breech, and the swinging carrier, of a latch-plate movable in the carrier, a pin carried by the carrier whereby to engage with said latch-plate when the carrier is swung to open position, and a pin on the gun-breech for engagement with the latch-plate when the swinging carrier is closed.

18. The combination of the gun-breech having right and left threads, the swinging carrier, the breech-block and locking-ring supported in the carrier, the operating-ring supported in the carrier, a latch-plate, a latch-pin supported in the carrier and engaging with the latch-plate, and a releasing-pin on the gun-breech for releasing the latch-pin from the latch-plate.

19. In a breech mechanism substantially as described the combination of the carrier, the operating-ring movable circumferentially therein and provided with inwardly-projecting portions or lugs, the breech-block having right and left threads, the locking-ring threaded internally on the breech-block and provided in its outer side with grooves extending longitudinally of the ring and receiving the lugs or projections on the operating-ring, and means for moving the operating-ring.

20. The combination in a breech mechanism, with the swinging carrier, the operating-ring, and the parts operated by said ring, of shoulders or abutments on the operating-ring and spaced apart, and the latch-plate arranged and operating between said abutments and provided with a notch to receive the latch-pin and the latch-pin spring actuated into said notch, and means for releasing the latch-pin.

21. The combination of the gun, breech-block, the locking-ring threaded thereon, the operating-ring on the locking-ring, means for turning the locking-ring by the movement of the operating-ring, means whereby the turning of the operating-ring in one direction may operate to turn the breech-block into the breech of the gun and whereby the turning of the operating-ring in the reverse direction may operate to turn the locking-ring into the gun.

22. The combination with the swinging carrier of the breech-block and locking-ring therein and the operating-ring turning in the carrier and upon the locking-ring and means for turning said operating-ring.

23. The combination with the swinging carrier and the crank and its shaft, of the operating-ring in the carrier, the devices within and arranged for operation by said ring and the pitman connecting the ring and crank, the latter being arranged to move past the center or line of the pitman and turn the operating-ring first in one and then in the opposite direction in both opening and closing the breech mechanism.

24. The combination with the swinging carrier and the operating-ring therein and having a reduced portion, of the latch-plate having a body portion operating along the outer face of, and a web operating along the outer edge of such reduced portion and provided with a notch for the latch-pin, the latch-pin and means for releasing the latch-pin.

25. The combination with the swinging carrier the breech-closing devices operating therein and the operating-ring for turning the said devices, of means independent of the breech-closing devices for locking the operating-ring from movement in the carrier when the latter is adjusted clear of the gun-breech.

26. The combination with the gun-breech and the swinging carrier, of the breech-closing devices operating in the carrier, the operating-ring for turning said devices, means independent of the breech-closing devices for locking the said ring from movement in the carrier when the latter is adjusted clear of the gun-breech and releasing devices on the gun-breech for freeing said locking devices when the carrier is adjusted against the gun-breech.

27. The combination in a breech mechanism of the swinging carrier, the breech-block, the locking-ring in the swinging carrier, and threaded upon the breech-block, and having external threads, the latch-plate, having a tooth engaging with the external threads of the locking-ring, the operating-ring coöperating with said latch, and the latch-pin for securing the latch in locked position.

28. The combination of the gun provided at its breech with the uninterrupted multiple right and left threads, the breech-block having the external right and left uninterrupted multiple threads, one set being formed to turn into the inner threads of the gun-breech, the locking-ring having internal threads screwing on the outer threads of the breech-block and external threads screwing into the outer threads of the gun-breech.

29. The combination of the locking-ring having an opening formed through it, the breech-block in said locking-ring and having a socket which registers with the opening in the locking-ring when the breech mechanism is in open position, the carrier for said parts and the operating devices having a finger or projection operating in the said opening and socket when the breech mechanism is in open position.

30. The combination of the gun-breech having the separate rings provided with right and left hand threads and screwed separately into the breech, the breech-block having external right and left hand threads, the locking-ring threaded on the breech-block and having external threads to screw into the gun-breech, the carrier, the operating-ring, the latch mechanism supported in the carrier, the rocking pitman pivoted to the operating-ring, the operating crank-shaft, the lever geared therewith and the latch-releasing pin on the gun-breech.

JOHN B. MOORE.

Witnesses:
SOLON C. KEMON,
PERRY B. TURPIN.